US008312336B2

(12) United States Patent
Chun et al.

(10) Patent No.: US 8,312,336 B2
(45) Date of Patent: Nov. 13, 2012

(54) METHOD OF AN UPLINK HARQ OPERATION AT AN EXPIRY OF TIME ALIGNMENT TIMER

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 833 days.

(21) Appl. No.: 12/363,263

(22) Filed: Jan. 30, 2009

(65) Prior Publication Data
US 2009/0204862 A1 Aug. 13, 2009

Related U.S. Application Data

(60) Provisional application No. 61/025,311, filed on Feb. 1, 2008, provisional application No. 61/087,153, filed on Aug. 7, 2008.

(30) Foreign Application Priority Data

Jan. 29, 2009 (KR) .......................... 10-2009-0007145

(51) Int. Cl.
*G06F 11/00* (2006.01)
(52) U.S. Cl. ........................................ 714/748; 714/749
(58) Field of Classification Search .................. 714/748, 714/749
See application file for complete search history.

(56) References Cited

U.S. PATENT DOCUMENTS

| 6,388,997 | B1* | 5/2002 | Scott .............................. 370/280 |
| 6,505,253 | B1 | 1/2003 | Chiu et al. | |
| 7,403,541 | B2 | 7/2008 | Yi et al. | |
| 7,631,239 | B2* | 12/2009 | Yeo et al. ........................ 714/748 |
| 7,804,850 | B2* | 9/2010 | Sebire et al. ................... 370/468 |
| 7,940,770 | B2 | 5/2011 | Moon et al. | |
| 2003/0100268 | A1 | 5/2003 | Moulsley et al. | |
| 2003/0123485 | A1 | 7/2003 | Yi et al. | |
| 2003/0128705 | A1 | 7/2003 | Yi et al. | |
| 2003/0131124 | A1 | 7/2003 | Yi et al. | |
| 2003/0147348 | A1 | 8/2003 | Jiang | |
| 2003/0152106 | A1 | 8/2003 | Burmeister et al. | |
| 2004/0008659 | A1 | 1/2004 | Kim | |
| 2004/0037224 | A1 | 2/2004 | Choi et al. | |

(Continued)

FOREIGN PATENT DOCUMENTS

CN           1620768 A       5/2005

(Continued)

OTHER PUBLICATIONS

"3GPP TS 36.321, V8.0.0, Medium Access Control Protocol Specification" Dec. 1, 2007, XP002521635, pp. 13-16.

(Continued)

*Primary Examiner* — Scott Baderman
*Assistant Examiner* — Elmira Mehramanesh
(74) *Attorney, Agent, or Firm* — Birch, Stewart, Kolasch & Birch, LLP

(57) ABSTRACT

Disclosed is the radio (wireless) communication system providing a radio communication service and the terminal, and more particularly, to a method of an uplink HARQ (Hybrid Automatic Repeat reQuest) operation at an expiry of time alignment timer in an Evolved Universal Mobile Telecommunications System (E-UMTS) evolved from the Universal Mobile Telecommunications System (UMTS) or a Long Term Evolution (LTE) system.

14 Claims, 9 Drawing Sheets

U.S. PATENT DOCUMENTS

| | | | |
|---|---|---|---|
| 2004/0153852 A1 | 8/2004 | Wu | |
| 2004/0213199 A1 | 10/2004 | Cheng | |
| 2004/0223507 A1 | 11/2004 | Kuchibhotla et al. | |
| 2005/0074024 A1 | 4/2005 | Kim et al. | |
| 2006/0056355 A1 | 3/2006 | Love et al. | |
| 2006/0067238 A1 | 3/2006 | Olsson et al. | |
| 2006/0156165 A1 | 7/2006 | Kim | |
| 2006/0176862 A1 | 8/2006 | Ishimori et al. | |
| 2006/0251027 A1 | 11/2006 | Chun et al. | |
| 2006/0282739 A1 | 12/2006 | Meyer et al. | |
| 2007/0079207 A1* | 4/2007 | Seidel et al. | 714/748 |
| 2007/0081513 A1 | 4/2007 | Torsner | |
| 2007/0097937 A1 | 5/2007 | Kubota et al. | |
| 2007/0116024 A1 | 5/2007 | Zhang et al. | |
| 2007/0133605 A1 | 6/2007 | Herrmann | |
| 2007/0168827 A1 | 7/2007 | Lohr et al. | |
| 2007/0293157 A1* | 12/2007 | Haartsen et al. | 455/67.11 |
| 2007/0300120 A1 | 12/2007 | Kim et al. | |
| 2008/0002660 A1* | 1/2008 | Jeong et al. | 370/350 |
| 2008/0010578 A1 | 1/2008 | Jiang | |
| 2008/0080472 A1* | 4/2008 | Bertrand et al. | 370/344 |
| 2008/0117891 A1 | 5/2008 | Damnjanovic et al. | |
| 2008/0215948 A1 | 9/2008 | Pinheiro et al. | |
| 2008/0253375 A1 | 10/2008 | Yi et al. | |
| 2008/0310396 A1 | 12/2008 | Park et al. | |
| 2009/0034476 A1 | 2/2009 | Wang et al. | |
| 2009/0034478 A1 | 2/2009 | Hobza | |
| 2009/0086657 A1* | 4/2009 | Alpert et al. | 370/310 |
| 2009/0104890 A1 | 4/2009 | Wang et al. | |
| 2009/0119564 A1 | 5/2009 | Sagfors et al. | |
| 2009/0175175 A1 | 7/2009 | Somasundaram et al. | |
| 2009/0175206 A1 | 7/2009 | Wang et al. | |
| 2009/0232107 A1* | 9/2009 | Park et al. | 370/336 |
| 2010/0157916 A1* | 6/2010 | Kim et al. | 370/329 |
| 2010/0279695 A1* | 11/2010 | Amirijoo et al. | 455/438 |

FOREIGN PATENT DOCUMENTS

| | | |
|---|---|---|
| CN | 1951043 A | 4/2007 |
| EP | 1353481 A2 | 10/2003 |
| EP | 1361706 A2 | 11/2003 |
| EP | 1788751 A1 | 5/2007 |
| EP | 1871137 A2 | 12/2007 |
| GB | 2 429 605 A | 2/2007 |
| JP | 2001-320417 A | 11/2001 |
| JP | 2004-274170 A | 9/2004 |
| JP | 2006-203265 A | 8/2006 |
| JP | 2006-245887 A | 9/2006 |
| JP | 2007-208635 A | 8/2007 |
| JP | 2007-288746 A | 11/2007 |
| JP | 2009-521891 A | 6/2009 |
| KR | 2002-0060800 A | 7/2002 |
| KR | 2003-0060026 A | 7/2003 |
| KR | 10-2006-0055175 A | 5/2006 |
| KR | 10-2007-0096392 A | 10/2007 |
| KR | 10-2007-0108801 A | 11/2007 |
| KR | 10-2007-0109313 A | 11/2007 |
| KR | 10-2007-0121585 A | 12/2007 |
| WO | WO 2005/034418 A1 | 4/2005 |
| WO | WO-2005/112327 A2 | 11/2005 |
| WO | WO 2007/052098 A2 | 5/2007 |
| WO | WO 2009/088903 A2 | 7/2009 |

OTHER PUBLICATIONS

3GPP Draft; R2-080153 Mac Control Procedure_TA_Control R2, 3rd Generation Partnership Project (3GPP), Mobile Competence Centre; France, vol. tsg_ran\WG2_RL2\TSGR2_60bis\Docs, Sevilla, Spain; 20080114, Jan. 8, 2008, pp. 1-3.

NTT Domoco et al: "UL SRS resource release at TA Timer expiry" 3GPP Draft; R2-080454, 3rd Generation Partnership Project (3GPP), Mobile Competence Centre; France, vol. tsg_ran\WG2_RL2\TSGR2_60bis\Docs, Sevilla, Spain; 20080114, Jan. 8, 2008, p. 1.

LG Electronics: "Handling of Nacked Date in HARQ Buffer When UL State is Out of Sync" 3GPP TSG-RAN WG2 #63, R2-084392, [Online] Aug. 18-22, 2008, pp. 1-2, XP002523066; retrieved from the Internet url:http://www.3gpp.org/ftp/tsg_ran/WG2_RL2/TSGR2_63/Docs/> [retrieved on Apr. 8, 2009], 2 pgs.

Somasundaram et al., "RRC Procedures for RLC Reset," U.S. Appl. No. 61/019,049, ITC-2-1945.00.US, pp. 1-19.

Wang et al., "Operation of Control Protocol Data Units in Packet Data Convergence Protocol," U.S. Appl. No. 60/976,139, ITC-2-1845.US, pp. 1-12.

"PDCP actions at RLC re-establishment", NTT DOCOMO, Inc., 3GPP TSG RAN WG2 #63, Aug. 18, 2008, retrieved from the Internet: http://www.3gpp.org/ftp/tsg_ran/WG2_RL2/TSGR2_63/Docs/, XP-002523462.

Interdigital: "RLC Window Management and Receive Buffer Overflow" 3GPP Draft; R2-080063, 3rd Generation Partnership Project (3GPP), Mobile Competence Centre; 650, Route Des Lucioles; F-06921 Sophia-Antipolis Cedex ; France, vol. RAN WG2, no. Sevilla, Spain; 20080109, Jan. 9, 2008, XP050137961 [retrieved on Jan. 9, 2008] p. 4, paragraph 2.

LG Electronics Inc: "RLC re-segmentation for improved L2 uplink" 3GPP Draft; R2-075099 RLC Resegmentation for Improved L2 Uplink, 3rd Generation Partnership Project (3GPP), Mobile Competence Centre; 650, Route Des Lucioles; F-06921 Sophia-Antipolis Cedex; France, vol. RAN WG2, no. Jeju; 20071112, Nov. 12, 2007 section 2.1 and 2.2.A; p. 1.

Qualcomm: "RLC Prioritization Scheme" 3GPP Draft; R2-051967 RLC Prioritization Scheme, 3rd Generation Partnership Project (3GPP), Mobile Competence Centre; 650, Route Des Lucioles; F-06921 Sophia-Antipolis Cedex; France, vol. RAN WG2, no. London, UK; 20050824, Aug. 24, 2005, XP050129109 [retrieved on Aug. 24, 2005] p. 1, last paragraph.

* cited by examiner

METHOD OF AN UPLINK HARQ OPERATION AT AN EXPIRY OF TIME ALIGNMENT TIMER

This Nonprovisional application claims priority under 35 U.S.C. §119(e) on U.S. Provisional Application No(s). 61/025,311 filed on Feb. 1, 2008, and 61/087,153 filed on Aug. 7, 2008, and under 35 U.S.C. §119(a) on Patent Application No(s). 10-2009-0007145 filed in the Republic of Korea, on Jan. 29, 2009, the entire contents of which are hereby incorporated by reference.

TECHNICAL FIELD

The present invention relates to a radio (wireless) communication system providing a radio communication service and a mobile terminal, and more particularly, to a method of an uplink HARQ operation of the mobile terminal in an Evolved Universal Mobile Telecommunications System (E-UMTS) or a Long Term Evolution (LTE) system.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

FIG. 2 shows exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1 (Layer 1), L2 (Layer 2), and L3 (Layer 3) based upon the lower three layers of the Open System Interconnection (OSI) standards model that is widely known in the field of communication systems.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 3 is only defined in the control plane, and handles the control of logical channels, transport channels, and physical channels with respect to the configuration, re-configuration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a Broadcast Channel (BCH) used for transmitting system information, and a downlink Shared Channel (SCH) used for transmitting user traffic or control messages. A downlink multicast, traffic of broadcast service or control messages may be transmitted via the downlink SCH or via a separate downlink Multicast Channel (MCH). As for channels used in uplink transmission for transmitting data from the mobile terminal to the network, there is a Random Access Channel (RACH) used for transmitting an initial control message, and an uplink Shared Channel (SCH) used for transmitting user traffic or control messages.

As for downlink physical channels for transmitting information transferred via the channels used in downlink transmission over a radio interface between the network and the terminal, there is a Physical Broadcast Channel (PBCH) for transmitting BCH information, a Physical Multicast Channel (PMCH) for transmitting MCH information, a Physical Downlink Shared Channel (PDSCH) for transmitting PCH and a downlink SCH information, and a Physical Downlink Control Channel (PDCCH) (also, referred to as 'DL L1/L2 control channel') for transmitting control information provided by the first and second layers such as a DL/UL Scheduling Grant, and the like. As for uplink physical channels for transmitting information transferred via the channels used in uplink transmission over a radio interface between the network and the terminal, there is a Physical Uplink Shared Channel (PUSCH) for transmitting uplink SCH information, a Physical Random Access Channel (PRACH) for transmitting RACH information, and a Physical Uplink Control Channel (PUCCH) for transmitting control information provided by the first and second layers, such as a HARQ ACK or NACK, a Scheduling Request (SR), a Channel Quality Indicator (CQI) report, and the like.

In LTE system, a HARQ operation is performed in a MAC (Medium Access Control) layer for an effective data transmission. The following is a detailed description of the HARQ operation.

FIG. 4 is an exemplary view showing a HARQ operation method for an effective data transmission. As illustrated in FIG. 4, a base station (or eNB) may transmit downlink scheduling information (referred as 'DL scheduling information' hereafter) through a PDCCH (Physical Downlink Control Channel) in order to provide data to a terminal (UE) during a HARQ operation. The DL scheduling information may include a UE identifier (UE ID), a UE group identifier (Group ID), an allocated radio resource assignment, a duration of the allocated radio resource assignment, a transmission parameter (e.g., Modulation method, payload size, MIMO related information, etc), HARQ process information, a redundancy version, or a new data indicator (NID), etc. Usually, the terminal (UE) performs multiple HARQ processes, the multiple HARQ processes are operated synchronously. Namely, each HARQ process is allocated synchronously in every transmission time interval (TTI). For example, a HARQ process 1 may perform in a first transmission time interval (TTI 1), a HARQ process 2 may perform in TTI 2, . . . , a HARQ process 8 may perform in TTI 8, the HARQ process 1 may again perform in TTI 9, and the HARQ process 2 may again perform in TTI 10, etc. Since the HARQ processes are allocated in synchronous manner, a certain HARQ process associated with a TTI which receives a PDCCH for initial transmission of a particular data may be used for such data transmission. For example, if the terminal receives a PDCCH including an uplink scheduling information in Nth TTI, the terminal may actually transmit a data in N+4 TTI.

The HARQ retransmission of the terminal is operated in a non-adaptive manner. That is, an initial transmission of a particular data is possible only when the terminal receives a PDCCH including an uplink scheduling information. However, the HARQ retransmission of the data can be possibly operated without receiving the PDCCH, as next TTI allocated to a corresponding HARQ process can be used with same uplink scheduling information. Here, transmission parameters may be transmitted through a control channel such as a PDCCH, and these parameters may be varied with a channel conditions or circumstances. For example, if a current channel condition is better than a channel condition of an initial transmission, higher bit rate may be used by manipulating a modulation scheme or a payload size. In contrast, if a current channel condition is worst than a channel condition of an initial transmission, lower bit rate may be used.

The terminal checks an uplink scheduling information by monitoring a PDCCH in every TTI. Then, the terminal transmits data through a PUSCH based on the uplink scheduling information. The terminal firstly generates the data in a MAC PDU format, and then stores it in a HARQ buffer. After that, the terminal transmits the data based on the uplink scheduling information. Later, the terminal waits to receive a HARQ feedback from a base station (eNB). If the terminal receives a HARQ NACK from the base station in response to the transmitted data, the terminal retransmits the data in a retransmission TTI of a corresponding HARQ process. If the terminal receives a HARQ ACK from the base station in response to the transmitted data, the terminal terminates to operate the retransmission of the HARQ. The terminal counts a number of transmissions (i.e. CURRENT_TX_NB) whenever the data is transmitted in a HARQ process. If the number of transmissions is reached to a maximum number of transmissions, which set by an upper layer, data in the HARQ buffer is flushed.

The HARQ retransmission is performed according to a HARQ feedback from a base station, a data existence in the HARQ buffer, or a transmission time of a corresponding HARQ process. Here, each of HARQ process may have a HARQ buffer respectively. The value in the NDI (New Data Indicator) field contained in the PDCCH may be used for the UE to determine whether the received data is an initial transmission data or a retransmitted data. More specifically, the NDI field is 1 bit field that toggles every time a new data is transmitted or received. (0->1->0->1-> . . . ) As such, the value in the NDI for the retransmitted data always has a same value used in an initial transmission. From this, the UE may know an existence of retransmitted data by comparing these values.

Description of an uplink timing alignment maintenance in a LTE system will be given. In the LTE system that based on an Orthogonal Frequency Division Multiplex (OFDM) technology, there is possibility of interferences between terminals (UEs) during a communication between UE and base station (eNB). In order to minimize interferences between terminals, it is important that the base station must manage or handle a transmission timing of the UE. More particularly, the terminal may exist in random area within a cell, and this implies that a data transmission time (i.e., traveling time of data from UE to base station) can be varied based on a location of the terminal. Namely, if the terminal is camped on edge of the cell, data transmission time of this specific terminal will be much longer than data transmission time of those terminals who camped on a center of the cell. In contrast, if the terminal is camped on the center of the cell, data transmission time of this specific terminal will be much shorter than data transmission time of those terminals who camped on the edge of the cell. The base station (eNB) must manage or handle all data or signals, which are transmitted by the terminals within the cell, in order to prevent the interferences between the terminals. Namely, the base station must adjust or manage a transmission timing of the terminals upon each terminal's condition, and such adjustment can be called as the timing alignment maintenance. One of the methods for maintaining the timing alignment is a random access procedure. Namely, during the random access procedure, the base station receives a random access preamble transmitted from the terminal, and the base station can calculate a time alignment (Sync) value using the received random access preamble, where the time alignment value is to adjust (i.e., faster or slower) a data transmission timing of the terminal. The calculated time alignment value can be notified to the terminal by a random access response, and the terminal can update the data transmission timing based on the calculated time alignment value. In other method, the base station may receive a sounding reference symbol (SRS) transmitted from the terminal periodically or randomly, the base station may calculate the time alignment (Sync) value based on the SRS, and the terminal may update the data transmission timing according to the calculated time alignment value.

As explained above, the base station (eNB) may measure a transmission timing of the terminal though a random access preamble or SRS, and may notify an adjustable timing value to the terminal. Here, the time alignment (Sync) value (i.e., the adjustable timing value) can be called as a time advance command (referred as 'TAC' hereafter). The TAC may be process in a MAC (Medium Access control) layer. Since the terminal does not camps on a fixed location, the transmission timing is frequently changed based on a terminal's moving location and/or a terminal's moving velocity. Concerning with this, if the terminal receives the time advance command (TAC) from the base station, the terminal expect that the time advance command is only valid for certain time duration. A time alignment timer (TAT) is used for indicating or representing the certain time duration. As such, the time alignment timer (TAT) is started when the terminal receives the TAC (time advance command) from the base station. The TAT value is transmitted to the terminal (UE) through a RRC (Radio Resource Control) signal such as system information (SI) or a radio bearer reconfiguration. Also, if the terminal receives a new TAC from the base station during an operation of the TAT, the TAT is restarted. Further, the terminal does not transmit any other uplink data or control signal (e.g., data on physical uplink shared channel (PUSCH), control signal on Physical uplink control channel (PUCCH)) except for the random access preamble when the TAT is expired or not running.

In general, a MAC layer of the terminal and base station handles a time alignment (synchronize) management. Namely, The TAC is generated in the MAC layer of the base station, and the MAC layer of the terminal receives the TAC through a MAC message from the base station. However, because the TAC is received by the MAC message, a transmission of the TAC is not fully guaranteed. For example, the base station transmits the MAC message including the TAC in a HARQ process, and the terminal attempts to receive the data. The terminal transmits a NACK signal to the base station if the terminal fails to decode the data. However, if such NACK signal is mistakenly treated as an ACK signal by the base station, a TAT of the base station is restarted whereas a TAT of the terminal is not restarted. Thusly, a failed synchronization can be happened between the terminal and base station.

Another example of drawback in a related art can be given as following. Firstly, the terminal receives an uplink scheduling information through a PDCCH for a transmission of data 1. Then, the terminal transmits the data 1 to the base station using the HARQ process. In response to the transmitted data 1, the terminal receives a NACK from the base station. Therefore the terminal has to retransmit the data 1, however, the TAT of the terminal can be expired before a retransmission of the data 1. In this situation, the terminal can not possibly retransmit the data 1 due to expiry of the TAT. Therefore, the terminal restarts the TAT after receiving a TAC from the base station though a random access channel (RACH) procedure. However, the terminal still transmits data 1 at a transmission timing of the HARQ process because the data 1 is still stored in a HARQ buffer of the terminal. In this case, the transmission of the data 1 is not expected by the base station, this data transmission can be collided with other data transmission by other terminals.

DISCLOSURE OF THE INVENTION

Therefore, an object of the present invention is to provide a method of processing data for a HARQ (Hybrid Automatic Repeat reQuest) in a wireless communication system, and more particularly, for an optimized uplink HARQ operation when time alignment timer is not running or at an expiry of time alignment timer.

To achieve this and other advantages and in accordance with the purpose of the present invention, as embodied and broadly described herein, there is provided a method of processing data for a HARQ (Hybrid Automatic Repeat Request) operation in a wireless communication system, the method comprising: receiving an uplink Grant from a network; generating a data unit based on the received uplink grant; storing the generated data unit into a plurality of buffers; and flushing the stored data unit in the plurality of buffers when a timer expires.

Also, To achieve this and other advantages and in accordance with the purpose of the present invention, as embodied and broadly described herein, there is also provided a method of processing data for a HARQ (Hybrid Automatic Repeat Request) operation in a wireless communication system, the method comprising: receiving an uplink Grant from a network; generating a data unit based on the received uplink grant; storing the generated data unit into a plurality of buffers; and flushing the stored data in the plurality of buffers when the timer is not running.

Also, To achieve this and other advantages and in accordance with the purpose of the present invention, as embodied and broadly described herein, there is also provided a method of processing data for a HARQ (Hybrid Automatic Repeat Request) operation in a wireless communication system, the method comprising: receiving an uplink Grant from a network; generating a data unit based on the received uplink grant; storing the generated data unit into a plurality of buffers; determining whether or not a timer is running; determining whether a command for starting the timer is received; and flushing the stored data in the plurality of buffers when it is determined that the timer is not running and the command is received.

MODES FOR CARRYING OUT THE PREFERRED EMBODIMENTS

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, a terminal (or UE) may perform a random access procedure in the following cases: 1) when the terminal performs an initial access because there is no RRC Connection with a base station (or eNB), 2) when the terminal initially accesses to a target cell in a handover procedure, 3) when it is requested by a command of a base station, 4) when there is uplink data transmission in a situation where uplink time synchronization is not aligned or where a specific radio resource used for requesting radio resources is not allocated, and 5) when a recovery procedure is performed in case of a radio link failure or a handover failure.

In the LTE system, the base station allocates a dedicated random access preamble to a specific terminal, and the terminal performs a non-contention random access procedure which performs a random access procedure with the random access preamble. In other words, there are two procedures in selecting the random access preamble: one is a contention based random access procedure in which the terminal randomly selects one within a specific group for use, another is a non-contention based random access procedure in which the terminal uses a random access preamble allocated only to a specific terminal by the base station. The difference between the two random access procedures is that whether or not a collision problem due to contention occurs, as described later. And, the non-contention based random access procedure may be used, as described above, only in the handover procedure or when it is requested by the command of the base station.

Figure 1:
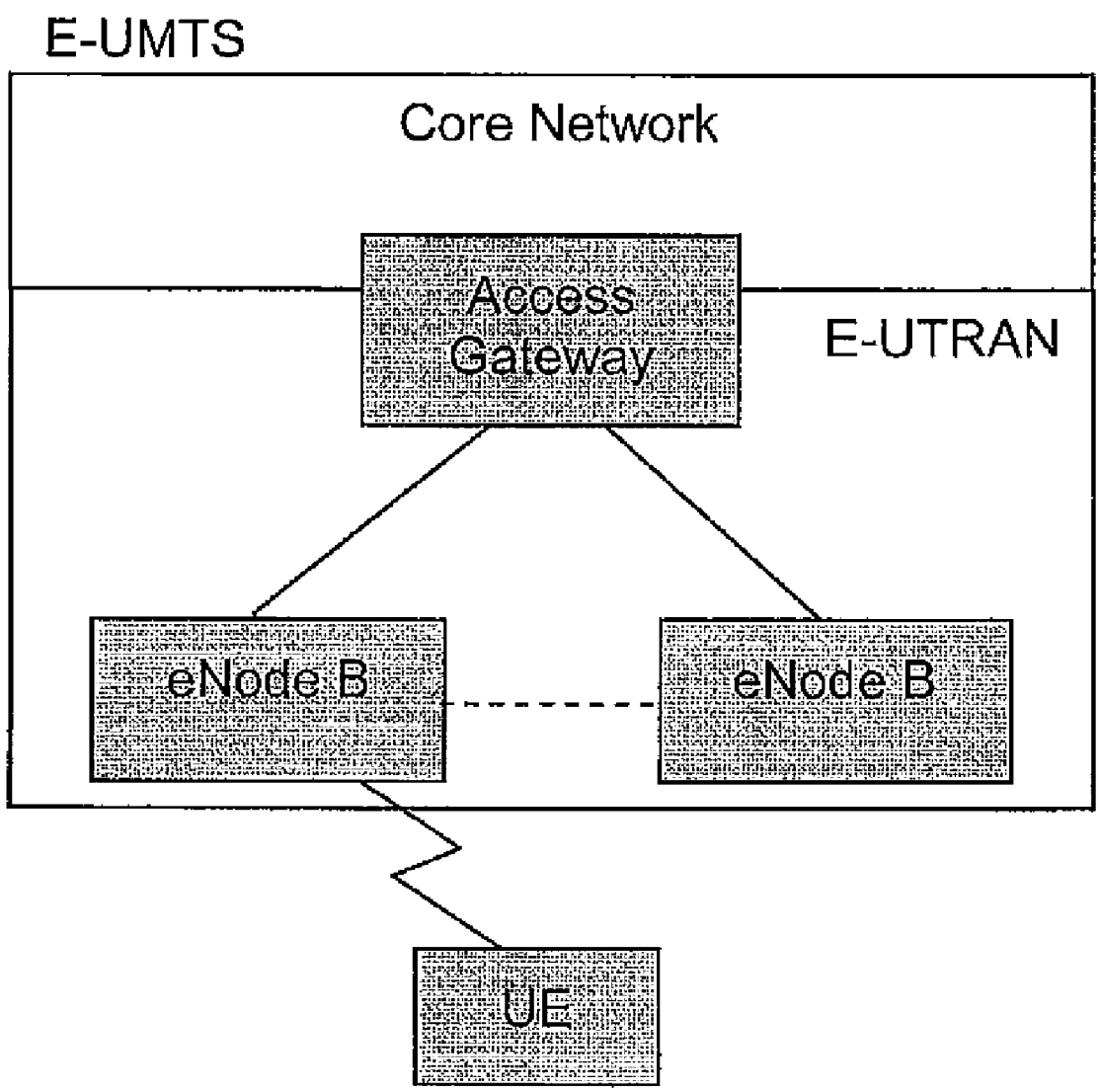
FIG. 1 shows an exemplary network structure of an Evolved Universal Mobile Telecommunications System (E-UMTS) as a mobile communication system to which a related art and the present invention are applied.
Figure 2:
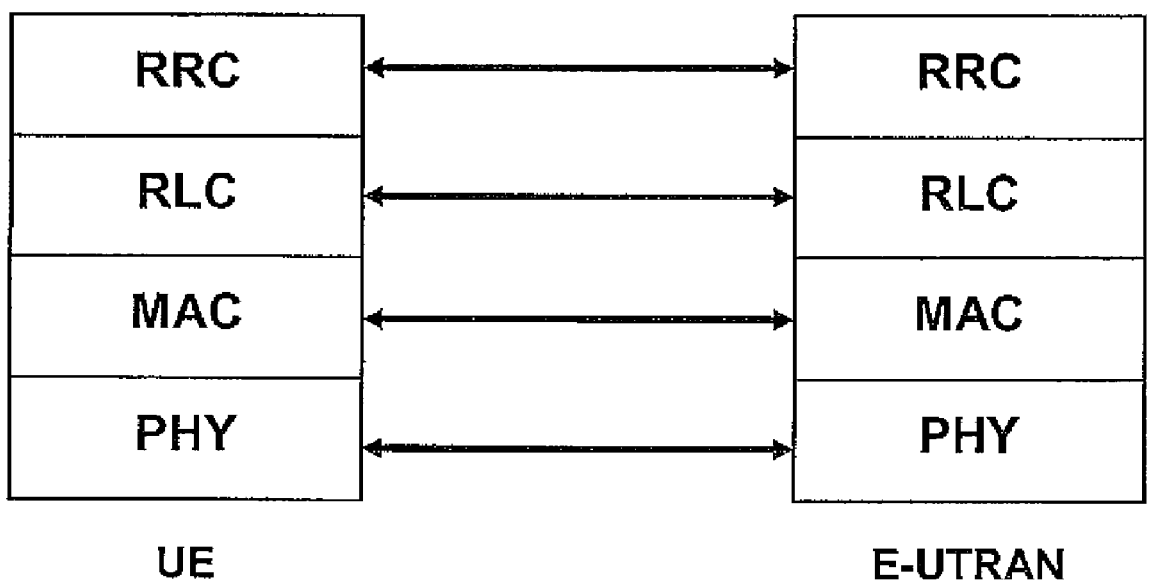
FIG. 2 shows an exemplary view of related art control plane architecture of a radio interface protocol between a terminal and an E-UTRAN.
Figure 3:
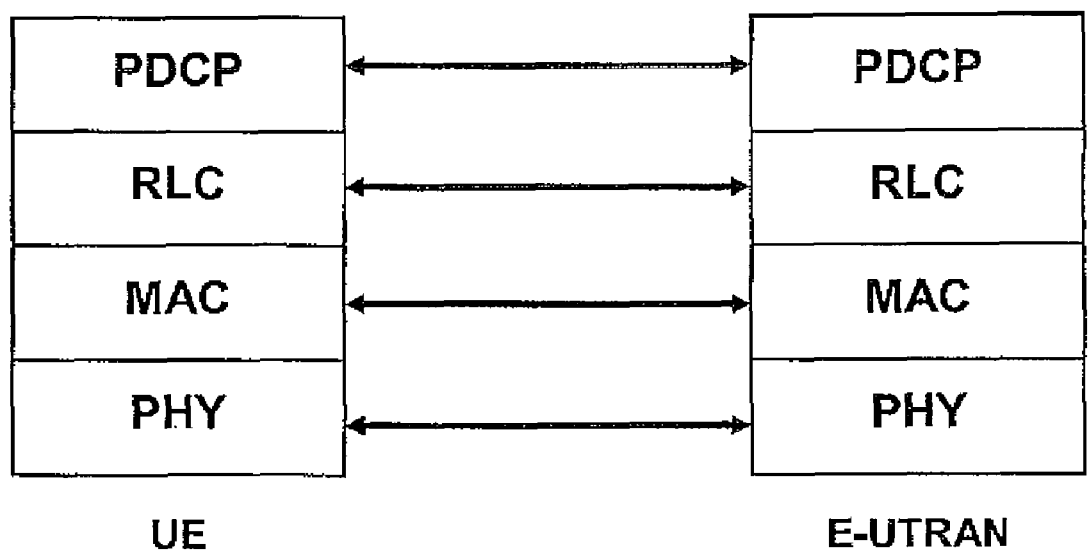
FIG. 3 shows an exemplary view of related art user plane architecture of a radio interface protocol between a terminal and an E-UTRAN.
Figure 4:
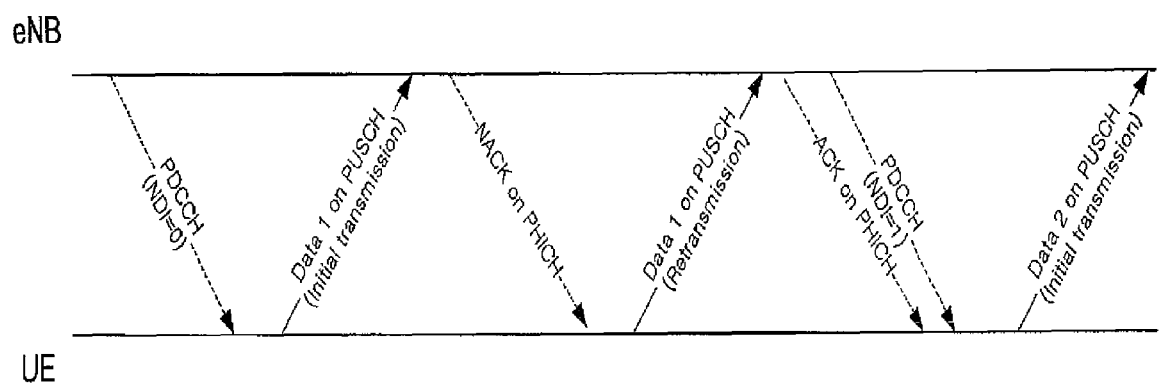
FIG. 4 is an exemplary view showing a HARQ operation method for an effective data transmission.
Figure 5:
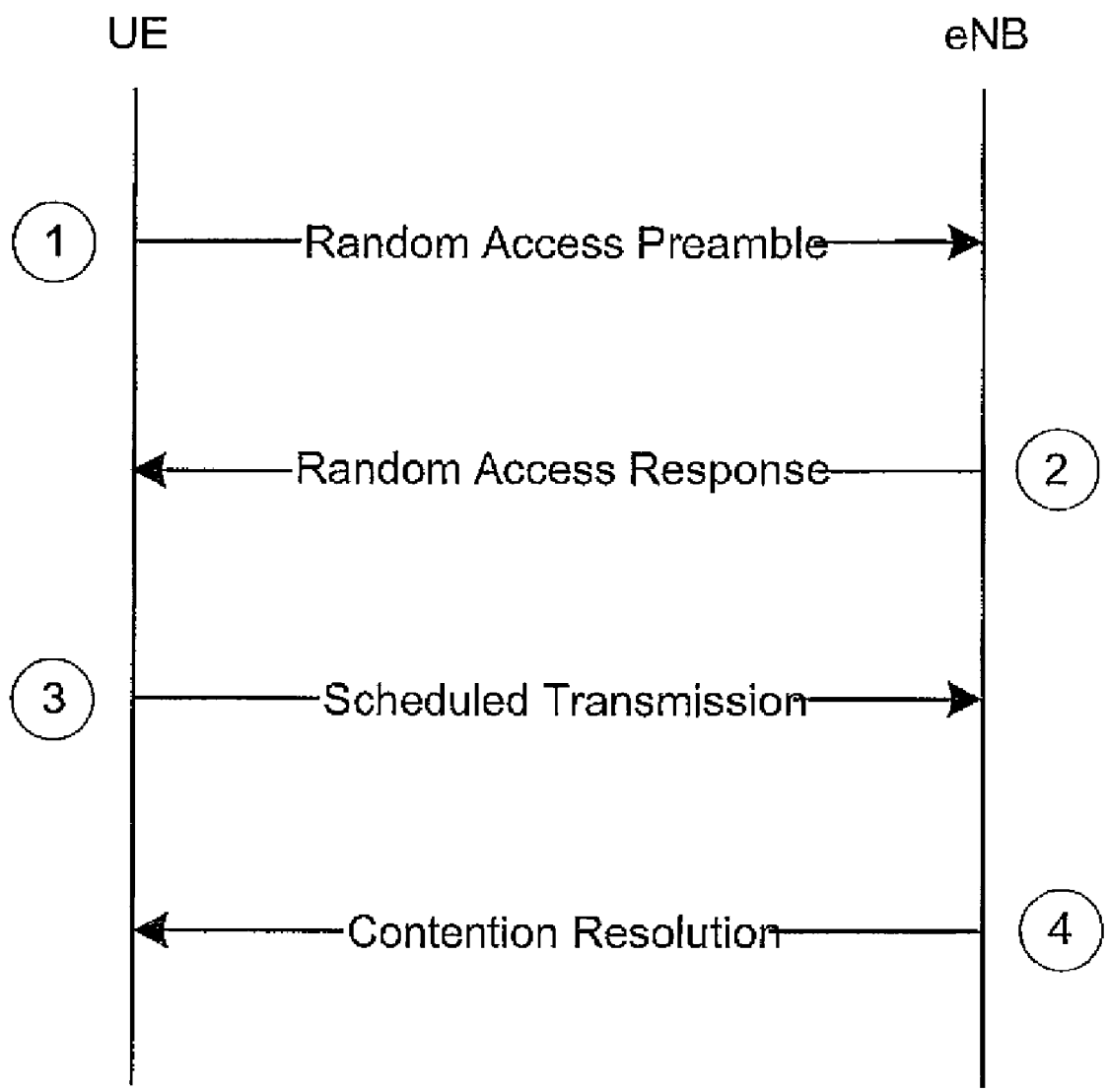
FIG. 5 shows an exemplary view of a contention based random access procedure.

Based on the above description, FIG. 5 shows an operation procedure between a terminal and a base station in a contention based random access procedure.

First, a terminal in the contention based random access randomly may select a random access preamble within a group of random access preambles indicated through system information or a handover command, may select PRACH resources capable of transmitting the random access preamble, and then may transmit the selected random access preamble to a base station (Step 1).

After transmitting the random access preamble, the terminal may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the terminal appropriately receives information transferred on the PDSCH. That is, the PDCCH may include information about a terminal that should receive the PDSCH, frequency and time information of radio resources of the PDSCH, a transfer format of the PDSCH, and the like. Here, if the PDCCH has been successfully received, the terminal may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify terminals to which information such as the UL Grant, the temporary C-RNTI, and the Time Alignment Command would be valid (available, effective) because one random access response may include random access response information for one or more terminals. Here, the random access preamble identifier may be identical to the random access preamble selected by the terminal in Step 1.

If the terminal has received the random access response valid to the terminal itself the terminal may process each of the information included in the random access response. That is, the terminal applies the Time Alignment Command, and stores the temporary C-RNTI. In addition, the terminal uses the UL Grant so as to transmit data stored in a buffer of the terminal or newly generated data to the base station (Step 3). Here, a terminal identifier should be essentially included in the data which is included in the UL Grant (message 3). This is because, in the contention based random access procedure, the base station may not determine which terminals are performing the random access procedure, but later the terminals should be identified for contention resolution. Here, two different schemes may be provided to include the terminal identifier. A first scheme is to transmit the terminal's cell identifier through the UL Grant if the terminal has already received a valid cell identifier allocated in a corresponding cell prior to the random access procedure. Conversely, the second scheme is to transmit the terminal's unique identifier (e.g., S-TMSI or random ID) if the terminal has not received a valid cell identifier prior to the random access procedure. In general, the unique identifier is longer than the cell identifier. In Step 3, if the terminal has transmitted data through the UL Grant, the terminal starts the contention resolution timer.

After transmitting the data with its identifier through the UL Grant included in the random access response, the terminal waits for an indication (instruction) of the base station for the contention resolution. That is, the terminal attempts to receive the PDCCH so as to receive a specific message (Step 4). Here, there are two schemes to receive the PDCCH. As described above, if the terminal identifier transmitted via the UL Grant is the cell identifier, the terminal attempts to receive the PDCCH by using its own cell identifier. If the terminal identifier transmitted via the UL Grant is its unique identifier, the terminal attempts to receive the PDCCH by using the temporary C-RNTI included in the random access response. Thereafter, for the former, if the PDCCH (message 4) is received through its cell identifier before the contention resolution timer is expired, the terminal determines that the random access procedure has been successfully (normally) performed, thus to complete the random access procedure. For the latter, if the PDCCH is received through the temporary cell identifier before the contention resolution timer is expired, the terminal checks data (message 4) transferred by the PDSCH that the PDCCH indicates. If the unique identifier of the terminal is included in the data, the terminal determines that the random access procedure has been successfully (normally) performed, thus to complete the random access procedure.

Figure 6:
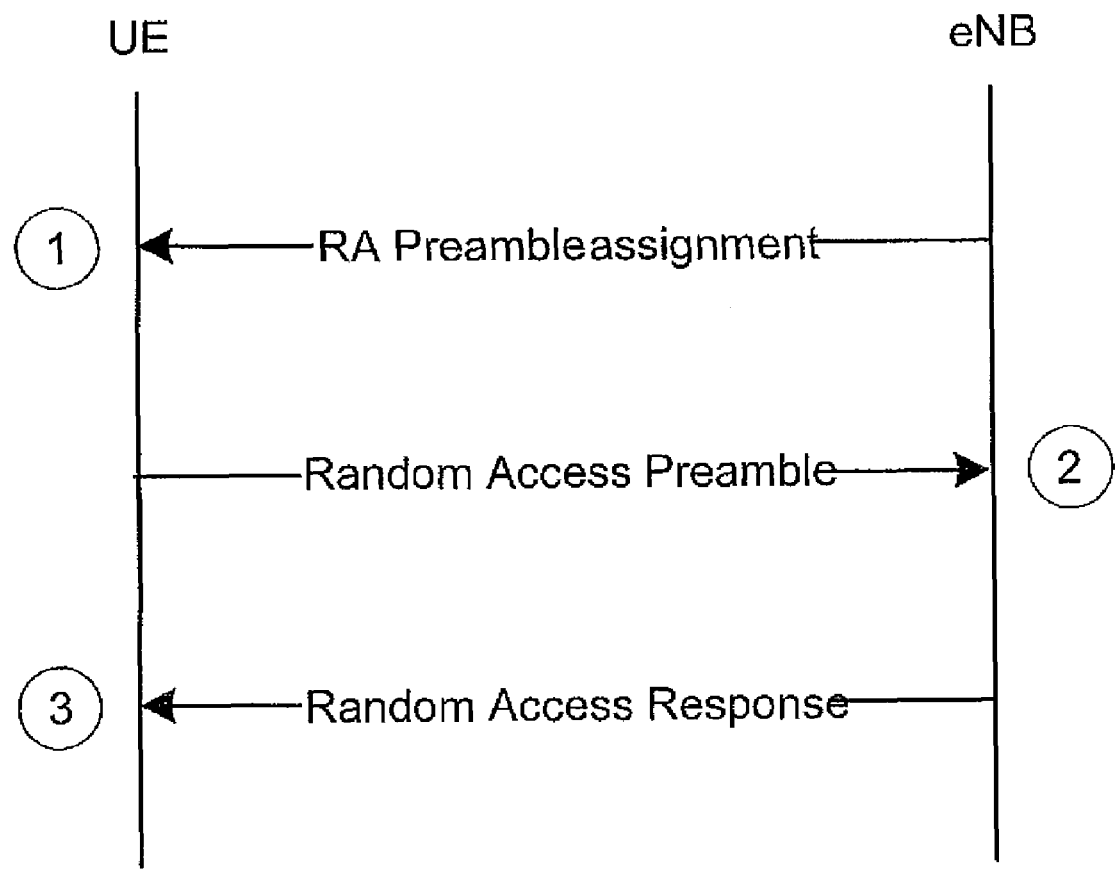
FIG. 6 shows an exemplary view of a non-contention based random access procedure.

FIG. 6 shows an operation procedure between a terminal and a base station in a non-contention based random access procedure. As compared with the contention based random access procedure, the random access procedure is determined to be successfully performed by receiving the random access response information in the non-contention based random access procedure, thus to complete the random access process.

In general, the non-contention based random access procedure may be performed in the following two cases: one is the handover procedure, and the other is a request by the command of the base station. To be certain, the contention based random access procedure may also be performed in those two cases. First, for the non-contention based random access procedure, it is important to receive, from the base station, a dedicated random access preamble without having any possibility of contention. Here, a handover command and a PDCCH command may be used to assign the random access preamble. Then, after the random access preamble dedicated to only the terminal itself has been assigned from the base station, the terminal transmits the preamble to the base station. Thereafter, the method for receiving the random access response information is the same as that in the above-described contention based random access procedure.

As aforementioned in this disclosure, the present invention proposes a method of flushing data in all HARQ buffer of the terminal when a time alignment timer (TAT) is not running or is expired.

Figure 7:
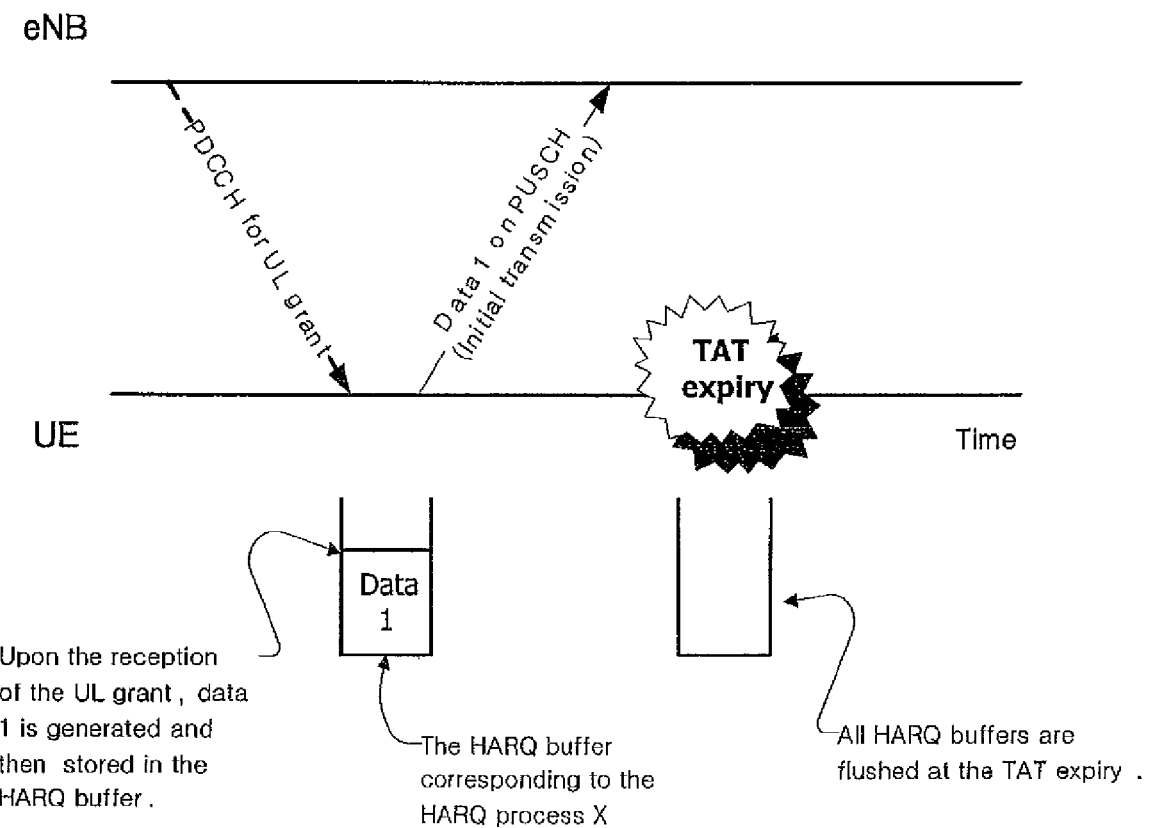
FIG. 7 shows an exemplary view of flushing data in HARQ buffer at an expiry of time alignment timer (TAT) according to the present invention.

FIG. 7 shows an exemplary view of flushing data in HARQ buffer at an expiry of time alignment timer (TAT) according to the present invention. As illustrated in FIG. 7, the present invention proposes to flush all HARQ buffers at the TAT expiry. More detailed description of FIG. 7 will be given as following. First, the terminal may receive a PDCCH (Physical Downlink Control Channel) including an uplink scheduling information (i.e. UL grant) for a data transmission of an uplink. Here, the PDCCH may include a C-RNTI (Cell-Radio Network Temporary Identifier) or Semi-Persistent Scheduling C-RNTI (SPS C-RNTI). Thereafter, the terminal may generate a MAC PDU (referred as MAC PDU-1 hereafter) according to the received uplink scheduling information, and may store the generated MAC PDU-1 in a corresponding HARQ buffer. Further, the terminal may transmit the stored MAC PDU-1 to the base station at a transmission timing of a corresponding HARQ process. After the MAC PDU-1 is transmitted, the terminal may wait to receive a HARQ feedback from the base station. At this moment, the time alignment timer (TAT) of the terminal may expire. According to the present invention, the terminal may flush data in all HARQ buffers including a HARQ buffer having the MAC PDU-1 at the time of TAT expiry.

Figure 8:
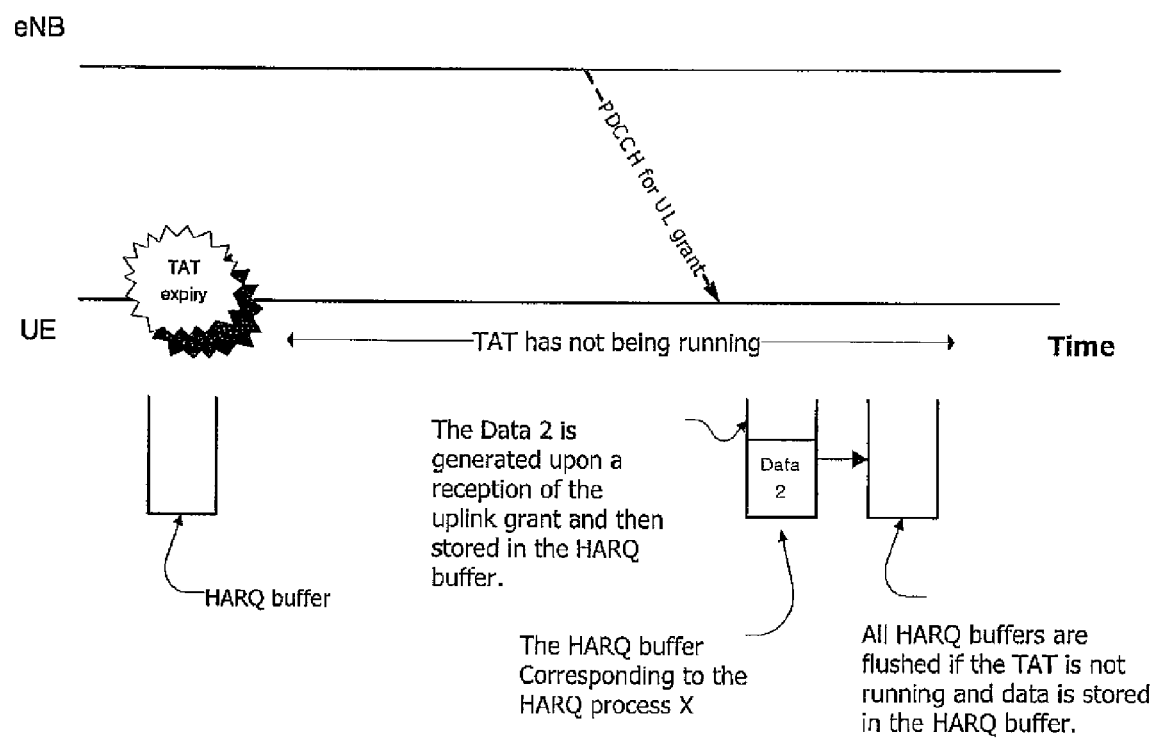
FIG. 8 shows an exemplary view of flushing data in HARQ buffer when a time alignment timer (TAT) is not running according to the present invention.

FIG. 8 shows an exemplary view of flushing data in HARQ buffer when a time alignment timer (TAT) is not running according to the present invention. As illustrated in FIG. 8, the present invention proposes to flush all HARQ buffers when the TAT is not running. More detailed description of FIG. 8 will be given as following. After the TAT is expired, the terminal may flush data in all HARQ buffers. Here, a current TAT of the terminal is not running and there is no data in all HARQ buffers. In this case, the terminal may further receive a PDCCH including an uplink scheduling information for an uplink data transmission. Here, the PDCCH may include a C-RNTI (Cell-Radio Network Temporary Identifier) or Semi-Persistent Scheduling C-RNTI (SPS C-RNTI). Thereafter, the terminal may generate a MAC PDU (referred as MAC PDU-2 hereafter) according to the received uplink scheduling information, and may store the generated MAC PDU-2 in a corresponding HARQ buffer. However, according to the present invention, the terminal may flush data in all HARQ because the TAT of the terminal is not running.

Figure 9:
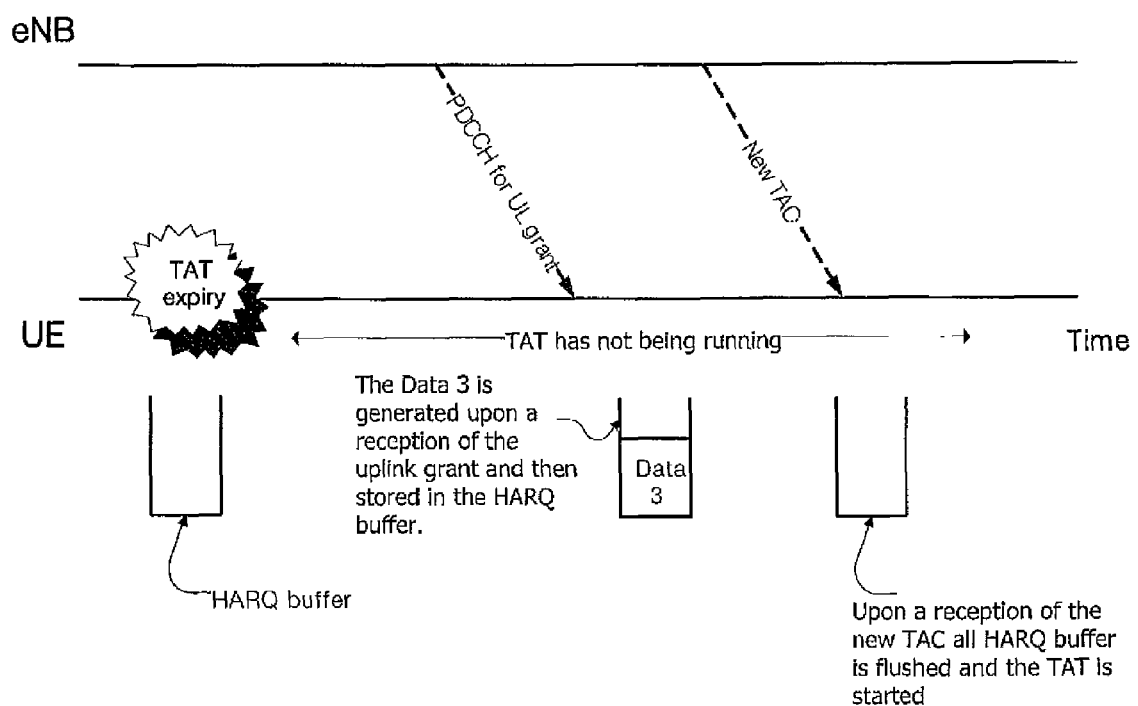
FIG. 9 shows an exemplary view of flushing data in HARQ buffer by receiving a new timing advance command (TAC) when a time alignment timer (TAT) is not running according to the present invention.

FIG. 9 shows an exemplary view of flushing data in HARQ buffer by receiving a new timing advance command (TAC) when a time alignment timer (TAT) is not running according to the present invention. As illustrated in FIG. 9, the present invention proposes to flush all HARQ buffers when the terminal receives a new TAC while a TAT of the terminal is not running after its expiration. More detailed description of FIG. 9 will be given as following. After the TAT is expired, the terminal may flush data in all HARQ buffers. While the TAT is not running, the terminal may further receive a PDCCH including an uplink scheduling information for an uplink data transmission. Here, the PDCCH may include a C-RNTI (Cell-Radio Network Temporary Identifier) or Semi-Persistent Scheduling C-RNTI (SPS C-RNTI). Thereafter, the terminal may generate a MAC PDU (referred as MAC PDU-3 hereafter) according to the received uplink scheduling information, and may store the generated MAC PDU-3 in a corresponding HARQ buffer. The terminal may attempt to transmit the MAC PDU-3 to the base station. However, since the TAT is not running, the terminal may not transmit the MACE PDU-3. Here, the MAC PDU-3 is kept in the corresponding HARQ buffer. At this moment, the terminal may receive a new TAC. For example, the terminal may receive the new TAC by a random access response during the random access channel (RACH) procedure. Once the new TAC is received by the terminal, the terminal may flush data in all HARQ buffer and may restart the TAT.

According to the present invention, when the time alignment timer expires, all HARQ buffers (i.e., all uplink HARQ buffers) are flushed and the next transmission for each process is considered as the very first transmission. Namely, the terminal may notify RRC of PUCCH/SRS release and may clear any configured downlink assignment and uplink grants.

The present disclosure may provide a method of processing data for a HARQ (Hybrid Automatic Repeat Request) operation in a wireless communication system, the method comprising: receiving an uplink Grant from a network; generating a data unit based on the received uplink grant; storing the generated data unit into a plurality of buffers; and flushing the stored data unit in the plurality of buffers when a timer expires, wherein the timer is a Time Alignment Timer (TAT), the uplink grant is received on a PDCCH (Physical Downlink Control Channel), the uplink grant includes at least one of uplink scheduling information, a C-RNTI (Cell-Radio Network Temporary Identifier), and a Semi-persistent Scheduling C-RNTI, the data unit is MAC PDU (Medium Access Control Protocol Data Unit), and the plurality of buffers is all uplink HARQ buffers.

It can be also said that the present invention may provide a method of processing data for a HARQ (Hybrid Automatic Repeat Request) operation in a wireless communication system, the method comprising: receiving an uplink Grant from a network; generating a data unit based on the received uplink grant; storing the generated data unit into a plurality of buffers; and flushing the stored data in the plurality of buffers when the timer is not running, wherein the timer is a time Alignment timer (TAT), the uplink grant is received on a PDCCH (Physical Downlink Control Channel), the uplink grant includes at least one of uplink scheduling information, a C-RNTI (Cell-Radio Network Temporary Identifier), and a Semi-persistent Scheduling C-RNTI, the data unit is MAC PDU (Medium Access Control Protocol Data Unit), and the plurality of buffers is all uplink HARQ buffers.

Also, the present invention may provide a method of processing data for a HARQ (Hybrid Automatic Repeat Request) operation in a wireless communication system, the method comprising: receiving an uplink Grant from a network; generating a data unit based on the received uplink grant; storing the generated data unit into a plurality of buffers; determining whether or not a timer is running; determining whether a command for starting the timer is received; and flushing the stored data in the plurality of buffers when it is determined that the timer is not running and the command is received, wherein the command is a Timing Advance Command (TAC).

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of processing data for a HARQ (hybrid automatic repeat request) operation in a wireless communication system including a time alignment timer (TAT) that is started when a time advance command (TAC) is received, the method comprising:
generating a data unit;
storing the generated data unit into one of a plurality of buffers; and
flushing the stored data unit in the one of the plurality of buffers when the TAT expires,
wherein the TAT is used for controlling an uplink time alignment, and
wherein PUCCH/SRS (Physical Uplink Control Channel/ Sounding Reference Symbol) resources are released when the TAT expires.

2. The method of claim 1, wherein an uplink grant is received from a network for transmitting the data unit to the network, and wherein the uplink grant is received on a PDCCH (Physical Downlink Control Channel).

3. The method of claim 2, wherein the uplink grant includes at least one of uplink scheduling information, a C-RNTI (Cell-Radio Network Temporary Identifier), and a Semi-persistent Scheduling C-RNTI.

4. The method of claim 2, wherein all configured downlink assignment data and the uplink grant are removed when the TAT expires.

5. The method of claim 1, wherein the data unit is a MAC PDU (Medium Access Control Protocol Data Unit).

6. The method of claim 1, wherein the plurality of buffers are all uplink HARQ buffers.

7. The method of claim 6, wherein each of the plurality of HARQ buffers are flushed when the TAT expires.

8. The method of claim 1, wherein a RRC (Radio Resource Control) layer entity is notified to release the PUCCH/SRS resources.

9. A method of processing data for a HARQ (hybrid automatic repeat request) operation in a wireless communication system including a time alignment timer (TAT) that is started when a time advance command (TAC) is received, the method comprising:
generating a data unit;
storing the generated data unit into one of a plurality of buffers; and
flushing the stored data unit in the one of the plurality of buffers when the TAT is determined not to be running,
wherein the TAT is used for controlling an uplink time alignment, and
wherein PUCCH/SRS (Physical Uplink Control Channel/ Sounding Reference Symbol) resources are released when the TAT expires.

10. The method of claim 9, wherein an uplink grant is received from a network for transmitting the data unit to the network, and wherein the uplink grant is received on a PDCCH (Physical Downlink Control Channel).

11. The method of claim 10, wherein the uplink grant includes at least one of uplink scheduling information, a C-RNTI (Cell-Radio Network Temporary Identifier), and a Semi-persistent Scheduling C-RNTI.

12. The method of claim 9, wherein the data unit is a MAC PDU (Medium Access Control Protocol Data Unit).

13. The method of claim 9, wherein the plurality of buffers are all uplink HARQ buffers.

14. A method of processing data for a HARQ (hybrid automatic repeat request) operation in a wireless communication system, the method comprising:
generating a data unit;
storing the generated data unit into one of a plurality of buffers;
determining whether a time alignment timer (TAT) is running;
determining whether a time alignment command (TAC) for starting the TAT is received; and
flushing the stored data unit in the one of the plurality of buffers when it is determined that the TAT is not running at a time when the TAC is received,
wherein the TAT is used for controlling an uplink time alignment, and
wherein PUCCH/SRS (Physical Uplink Control Channel/ Sounding Reference Symbol) resources are released when the TAT expires.

* * * * *